United States Patent
Tang et al.

(10) Patent No.: US 11,981,594 B2
(45) Date of Patent: May 14, 2024

(54) QUARTZ GLASS WITH LOW CONTENT OF HYDROXYL AND HIGH PURITY AND METHOD FOR PREPARING THE SAME

(71) Applicants: ZHONGTIAN TECHNOLOGY ADVANCED MATERIALS CO., LTD., Nantong (CN); JIANGSU ZHONGTIAN TECHNOLOGY CO., LTD., Nantong (CN)

(72) Inventors: Ming-Ming Tang, Nantong (CN); Meng-Fei Wang, Nantong (CN); Yi-Gang Qian, Nantong (CN); Jun-Yi Ma, Nantong (CN); Xian-Gen Zhang, Nantong (CN); Yi-Chun Shen, Nantong (CN); Ya-Li Chen, Nantong (CN)

(73) Assignees: ZHONGTIAN TECHNOLOGY ADVANCED MATERIALS CO., LTD., Nantong (CN); JIANGSU ZHONGTIAN TECHNOLOGY CO., LTD., Nantong (CN)

(*) Notice: Subject to any disclaimer, the term of this patent is extended or adjusted under 35 U.S.C. 154(b) by 233 days.

(21) Appl. No.: 17/422,897

(22) PCT Filed: Dec. 9, 2020

(86) PCT No.: PCT/CN2020/134893
§ 371 (c)(1),
(2) Date: Jul. 14, 2021

(87) PCT Pub. No.: WO2021/174936
PCT Pub. Date: Sep. 10, 2021

(65) Prior Publication Data
US 2022/0340469 A1    Oct. 27, 2022

(30) Foreign Application Priority Data
Sep. 22, 2020 (CN) .......................... 202011001200.0

(51) Int. Cl.
*C03B 19/06* (2006.01)
*C03B 19/14* (2006.01)
(Continued)

(52) U.S. Cl.
CPC ........ *C03B 19/066* (2013.01); *C03B 19/1453* (2013.01); *C03C 1/022* (2013.01);
(Continued)

(58) Field of Classification Search
None
See application file for complete search history.

(56) References Cited

U.S. PATENT DOCUMENTS 4,317,668 A    3/1982 Susa et al.
4,938,788 A    7/1990 Segawa et al.
(Continued)

FOREIGN PATENT DOCUMENTS

CN    103153887 A    6/2013
CN    110040942 A    7/2019
(Continued)

OTHER PUBLICATIONS

JP 62-158121 machine translation, Kenmochi et al., Method for Homogenizing Glass, Jul. 1987 (Year: 1987).*
(Continued)

*Primary Examiner* — Queenie S Dehghan
(74) *Attorney, Agent, or Firm* — ScienBiziP, P.C.

(57) ABSTRACT

A method for preparing quartz glass with low content of hydroxyl and high purity, includes providing silica powders including hydroxyl groups. The silica powders are dehydroxylated, which includes drying the silica powders at a first temperature, heating the silica powders up to a second temperature and introducing a first oxidizing gas including halogen gas, thereby obtaining first dehydroxylated powders, and heating the first dehydroxylated powders up to a
(Continued)

third temperature and introducing a second oxidizing gas including oxygen or ozone, thereby obtaining second dehydroxylated powders. The second dehydroxylated powders are heated up to a fourth temperature to obtain a vitrified body. The vitrified body is cooled to obtain the quartz glass with low content of hydroxyl and high purity. The quartz glass prepared by the above method has low content of hydroxyl and high purity. A quartz glass with low content of hydroxyl and high purity is also provided.

9 Claims, 4 Drawing Sheets

(51) Int. Cl.
  *C03C 1/02* (2006.01)
  *C03C 3/06* (2006.01)
  C03B 25/00 (2006.01)
(52) U.S. Cl.
  CPC ............... *C03C 3/06* (2013.01); *C03B 25/00* (2013.01); *C03B 2201/04* (2013.01); *C03C 2201/02* (2013.01); *C03C 2203/10* (2013.01); *C03C 2203/40* (2013.01); *C03C 2204/00* (2013.01)

(56) References Cited

U.S. PATENT DOCUMENTS

| 6,550,277 | B1 | 4/2003 | Uebbing et al. |
| 2003/0121283 | A1 | 7/2003 | Yu |

FOREIGN PATENT DOCUMENTS

| JP | S56-104732 | A | 8/1981 |
| JP | H03-017775 | B2 | 3/1991 |
| JP | H05-058667 | A | 3/1993 |
| JP | H05-186234 | A | 7/1993 |
| JP | H06-263468 | A | 9/1994 |
| JP | 2004-026586 | A | 1/2004 |
| JP | 2004-338992 | A | 12/2004 |
| JP | 2010-528960 | A | 8/2010 |
| JP | 2017077977 | A | 4/2017 |
| KR | 10-1494477 | B1 | 2/2015 |

OTHER PUBLICATIONS

EP 1 982 963 machine translation, Kuehn et al., Method for Producing and Optical Component of Synthetic Quartz Glass, Oct. 2008 (Year: 2008).*
CN 103153887 machine translation, Lehmann et al., Method for Producing Synthetic Quartz Glass Particles, Sep. 2016 (Year: 2016).*

* cited by examiner

QUARTZ GLASS WITH LOW CONTENT OF HYDROXYL AND HIGH PURITY AND METHOD FOR PREPARING THE SAME

FIELD

The disclosure relates to material preparations, and more particularly, to a quartz glass with low content of hydroxyl and high purity and a method for preparing the quartz glass.

BACKGROUND

Quartz glass is made by melting pure silica, which is widely used in fields of lenses, prisms, reflection mirrors, windows, photomasks, and wafers.

In existing technologies, the quartz glass is usually prepared by a one-step method (that is, directly prepared by a vapor deposition method such as CVD, PVCD, etc.). The one-step method for preparing the quartz glass has advantages of low deposition temperature, high deposition rate, low energy consumption, and low production cost, making it the first choice for preparing the quartz glass.

However, the quartz glass prepared by the one-step method has a high hydroxyl content, and the uniformity of the quartz glass is not high.

SUMMARY

A method for preparing quartz glass with low content of hydroxyl and high purity is needed to make quartz glass with a low content of hydroxyl.

In addition, the quartz glass with low content of hydroxyl and high purity prepared by the above method is also needed.

A method for preparing quartz glass with low content of hydroxyl and high purity, includes providing silica powders, and the silica powders including hydroxyl groups. The silica powders are dehydroxylated, which includes drying the silica powders at a first temperature, heating the silica powders up to a second temperature and introducing a first oxidizing gas including halogen gas, thereby obtaining first dehydroxylated powders, and heating the first dehydroxylated powders up to a third temperature and introducing a second oxidizing gas including oxygen or ozone, thereby obtaining second dehydroxylated powders. The second dehydroxylated powders are heated up to a fourth temperature to obtain a vitrified body. The vitrified body is cooled to obtain the quartz glass with low content of hydroxyl and high purity.

Furthermore, before heating the second dehydroxylated powders up to the fourth temperature to obtain the vitrified body, the method further includes heating the vitrified body up to a fifth temperature in a range of 1600 degrees Celsius to 2300 degrees Celsius for 1 hour or more, thereby homogenizing the vitrified body at high temperature.

Furthermore, cooling the vitrified body further includes cooling the vitrified body from the fourth temperature to room temperature with a cooling speed greater or equal to 20 minutes per degree Celsius.

Furthermore, preparation of the silica powders includes providing a silicon-containing raw material, and hydrolyzing the silicon-containing raw material by a vapor deposition method to form the silica powders.

Furthermore, the silicon-containing raw material includes at least one of $SiF_4$, $C_6H_{18}O_3Si_3$, $C_8H_{24}O_4Si_4$, $C_{10}H_{30}O_5Si_5$, and $C_{12}H_{36}O_6Si_6$.

Furthermore, the vapor deposition method includes one of a chemical vapor deposition method, a plasma chemical vapor deposition method, a vapor axial deposition method, and an outside vapor deposition method.

Furthermore, at least one of the first oxidizing gas includes at least one of fluorine gas, chlorine gas, and bromine gas.

Furthermore, at least one of the first oxidizing gas and the second oxidizing gases further includes an inert gas, and the inert gas includes at least one of nitrogen, helium, and argon.

Furthermore, the first temperature is in a range of 200 degrees Celsius to 400 degrees Celsius, the second temperature is in a range of 700 degrees Celsius to 1000 degrees Celsius, the third temperature is in a range of 1050 degrees Celsius to 1250 degrees Celsius, and the fourth temperature is in a range of 1300 degrees Celsius to 1500 degrees Celsius.

A quartz glass with low content of hydroxyl and high purity prepared by the above method is also provided. The quartz glass has a content of hydroxyl less than 1 ppm.

In the method for preparing the quartz glass with low content of hydroxyl and high purity according to the present disclosure, the hydroxyl groups are removed by the first oxidizing gas, and the elements of the first oxidizing gas is removed by the second oxidizing gas. Thus, the quartz glass with low content of hydroxyl and high purity can be prepared.

Many aspects of the disclosure may be better understood with reference to the following drawings.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are not to be considered as limiting the scope of the embodiments.

Implementations of the disclosure will now be described, by way of embodiments only, with reference to the drawings. It should be noted that non-conflicting details and features in the embodiments of the present disclosure may be combined with each other.

Figure 1:
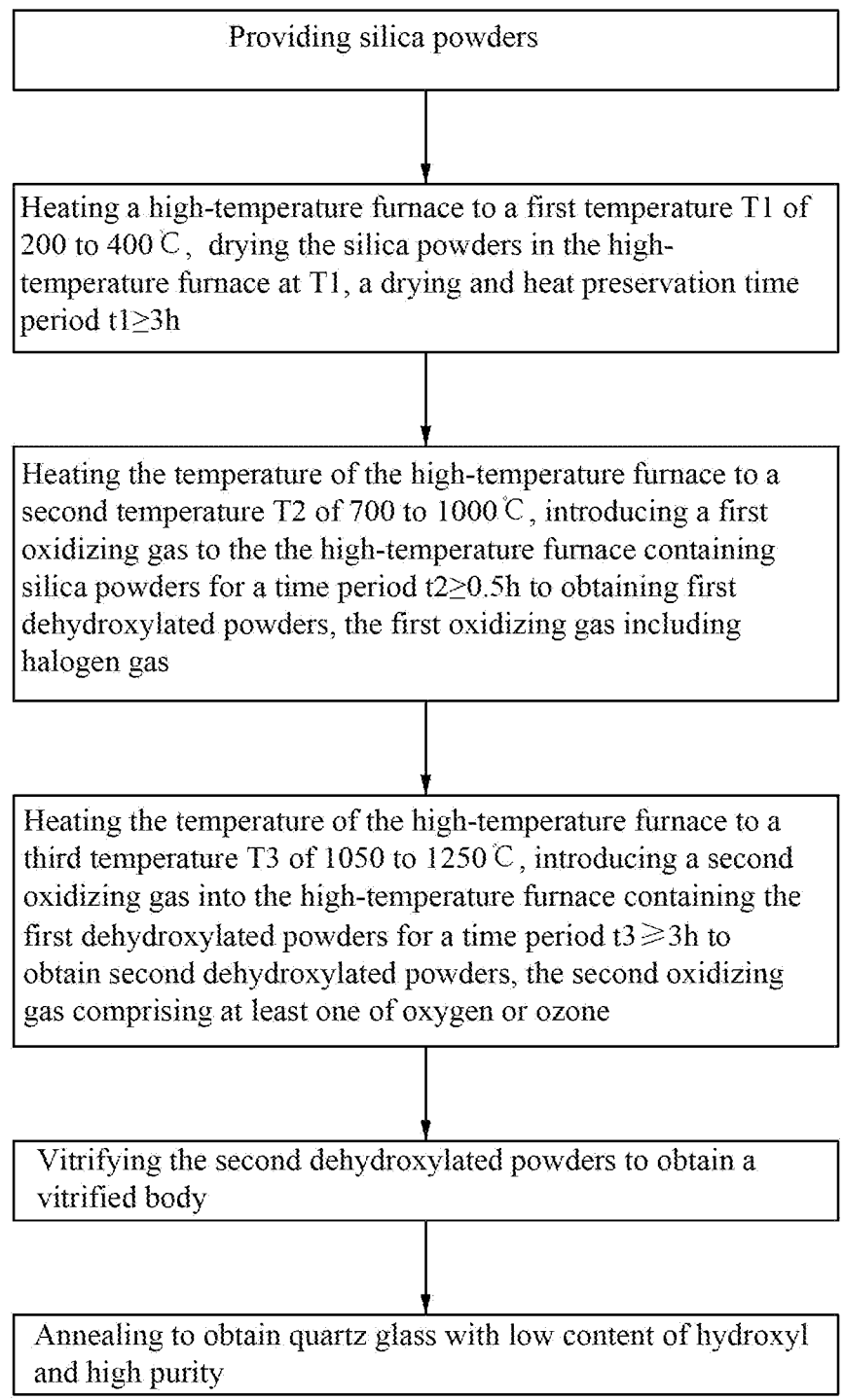
FIG. 1 is a flowchart of a method for preparing quartz glass with low content of hydroxyl and high purity, according to the present disclosure.

FIG. 1 illustrates an embodiment of a method for preparing quartz glass with low content of hydroxyl and high purity, which includes following steps.

S1: silica powders are provided.

In the embodiment, the preparation of the silica powders in S1 includes following step.

S10: a silicon-containing raw material is provided. The silicon-containing raw material is SiCl$_4$, and a purity of the SiCl$_4$ is greater than 99.999% (calculated by mass percentage). In other embodiments, the silicon-containing raw material may include at least one of SiF$_4$, C$_6$H$_{18}$O$_3$Si$_3$, C$_8$H$_{24}$O$_4$Si$_4$, C$_{10}$H$_{30}$O$_5$Si$_5$, and C$_{10}$H$_{36}$O$_6$Si$_6$.

S11: the silicon-containing raw material is hydrolyzed by vapor axial deposition (VAD) to form the silica powders. The vapor axial deposition method includes placing the silicon-containing raw material in a hydrogen-oxygen flame to obtain the silica powders after reaction. The reaction equation of the silicon-containing raw material in the hydrogen-oxygen flame is as follows.

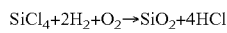

$$SiCl_4+2H_2+O_2 \rightarrow SiO_2+4HCl$$

In the embodiment, the silica powders are in a gray and loose state, and the density ρ of the silica powders is 0.5 g/cm$^3$ to 0.9 g/cm$^3$. A large number of water molecules or hydroxyl groups may be introduced into the silicon-containing raw material during the reaction in the hydrogen-oxygen flame. The water molecules exist in the silica powders in a free state, and the hydroxyl groups are bonded to the silica powders by hydrogen bonds or covalent bonds.

In other embodiments, the silica powder may also be prepared by outside vapor deposition (OVD).

S2: the silica powders are dehydroxylated. The dehydroxylation includes following steps.

Figure 3:
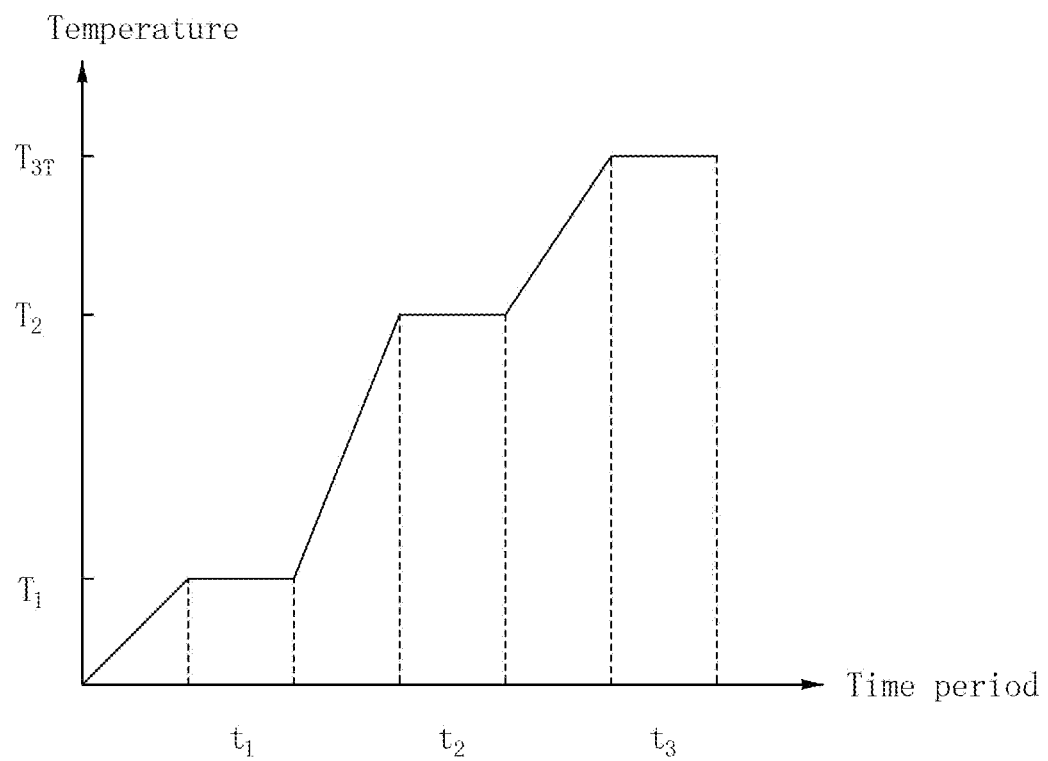
FIG. 3 is a graph of temperatures and time periods during dihydroxylation.

S20: referring to FIG. 3, a temperature of a high-temperature furnace is adjusted to a first temperature T1. The first temperature T1 is 200 degrees Celsius to 400 degrees Celsius. The silica powders are then dried in the high-temperature furnace at the temperature of T1, and the drying and heat preservation time period is t1, wherein t1≥3 h. The free water molecules in the silica powders are then removed.

In the embodiment, the drying and heat preserving in S20 is performed in an inert gas atmosphere. A purity of the inert gas is 99.999999%, and the inert gas includes at least one of nitrogen, helium, and argon.

S21: the temperature of the high-temperature furnace is raised to a second temperature T2, wherein the second temperature T2 is 700 degrees Celsius to 1000 degrees Celsius. A first oxidizing gas is introduced into the high-temperature furnace containing the silica powders for a time period t2, wherein t2≥0.5 h. A first dehydroxylated powders are then obtained.

In the embodiment, in S21, the first oxidizing gas includes at least one of fluorine gas, chlorine gas, and gaseous bromine. The highly electronegative atoms (fluorine atoms, chlorine atoms, and bromine atoms) in the first oxidizing gas can replace the hydroxyl groups and other impurities (for example, metal atoms) in the silica through a redox reaction.

In the embodiment, in S21, a total mass of the introduced first oxidizing gas is within 1% of a total mass of the silica powders. When the total mass of the introduced first oxidizing gas exceeds 1% of the total mass of the silica powders, the excessive first oxidizing gas may be doped into the silica powders, thereby affecting the uniformity of the subsequent obtained quartz glass and causing waste of the first oxidizing gas at the same time.

In the embodiment, the first oxidizing gas further includes the inert gas, and the inert gas functions as a carrier to send oxygen and/or ozone into the high-temperature furnace.

S22: the temperature of the high-temperature furnace is further raised to a third temperature T3, and the third temperature T3 is 1050 degrees Celsius to 1250 degrees Celsius. A second oxidizing gas is introduced into the high-temperature furnace containing the first dehydroxylated powders for a time period t3, wherein t3≥3 h. A second dehydroxylated powders are obtained. The second oxidizing gas includes at least one of oxygen or ozone. The first oxidizing gas and the second oxidizing gas include halogen atoms and oxygen atoms, respectively. The halogen atoms in the first oxidizing gas can be bonded with the first dehydroxylated powders to form silicon-halide bonds. The oxygen atoms in the second oxidizing gas can be bonded with the first dehydroxylated powders to form silicon-oxygen bonds. Since the silicon-oxygen bonds are more stable than the silicon-halogen bonds, the halogen atoms bonded to the first dehydroxylated powders are easily replaced by the oxygen atom, and further be carried out by the inert gas. Thus, elements of fluorine, chlorine, or bromine element is removed, so that an optical uniformity of the subsequent obtained quartz glass can be improved.

In the embodiment, the second oxidizing gas in S23 further includes the inert gas, and the inert gas function as a carrier to send oxygen and/or ozone into the high-temperature furnace.

S3: the second dehydroxylated powders are heated to a fourth temperature to vitrify the second dehydroxylated powders, thereby obtaining a vitrified body.

In the embodiment, the vitrification in S3 includes introducing the inert gas into the high-temperature furnace to carry out the remaining free oxygen and chlorine in the furnace. Then, the temperature is gradually raised to the fourth temperature T4 to vitrify the powders. The fourth temperature T4 ranges from 1300 degrees Celsius to 1500 degrees Celsius, and the reaction time period is t4, wherein t4≥1 h.

S4: Annealing and cooling are performed. Then, the quartz glass with low content of hydroxyl and high purity is obtained.

Figure 4:
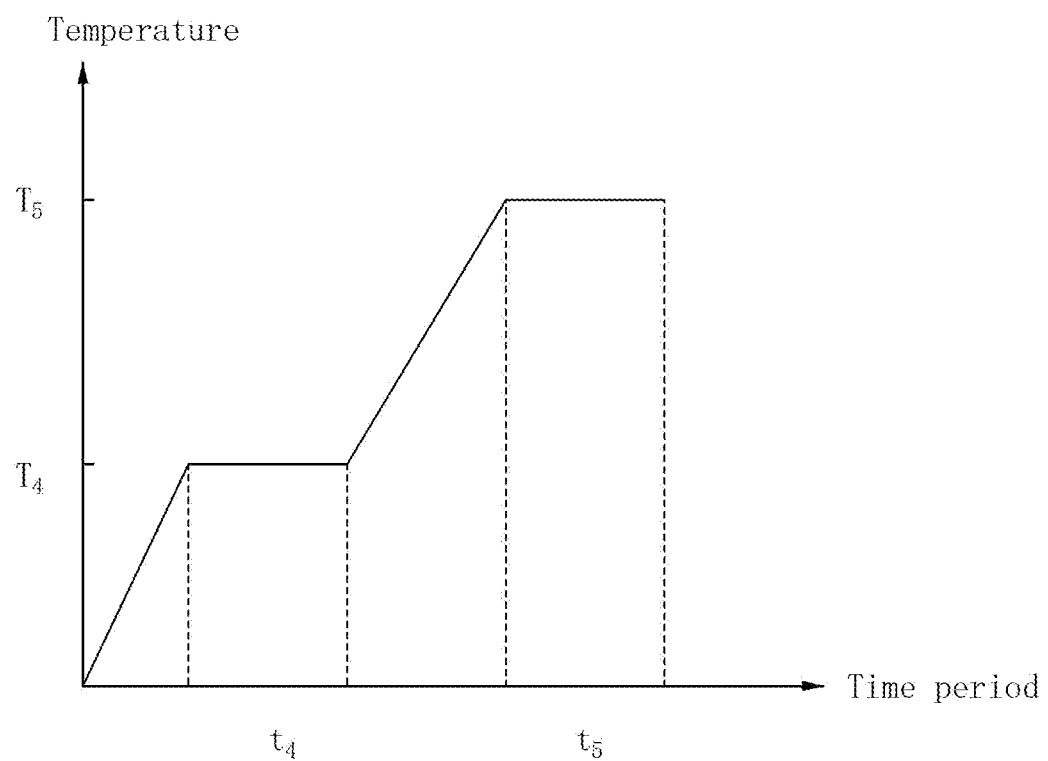
FIG. 4 is a graph of temperatures and time periods during vitrification and homogenization.

In the embodiment, referring to FIG. 4, in step S4, the annealing includes cooling the vitrified body from the fourth temperature T4 at a cooling speed v, wherein v≥20 minutes per degree Celsius.

In the embodiment, steps as follows are further included between S3 and S4.

S30: the temperature of the high-temperature furnace is further raised to a fifth temperature T5. The fifth temperature T5 is 1600 degrees Celsius to 2300 degrees Celsius, and the preservation time period is t5, wherein t5≥1 h. Thus, the vitrified body is homogenized at high temperature, and elements of fluorine, chlorine, or bromine are further removed to improve the optical uniformity of the subsequent obtained quartz glass.

The present disclosure also provides a quartz glass with low content of hydroxyl and high purity, which is prepared by the above method. The content of hydroxyl in the quartz glass is less than 1 ppm, and the optical uniformity (defined as an uneven degree of refractive index changes over different portions in a designated region) is less than or equal to 4.3×10$^{-5}$. Preferably, the optical uniformity of the quartz glass is less than 2×10$^{-6}$.

Figure 2:
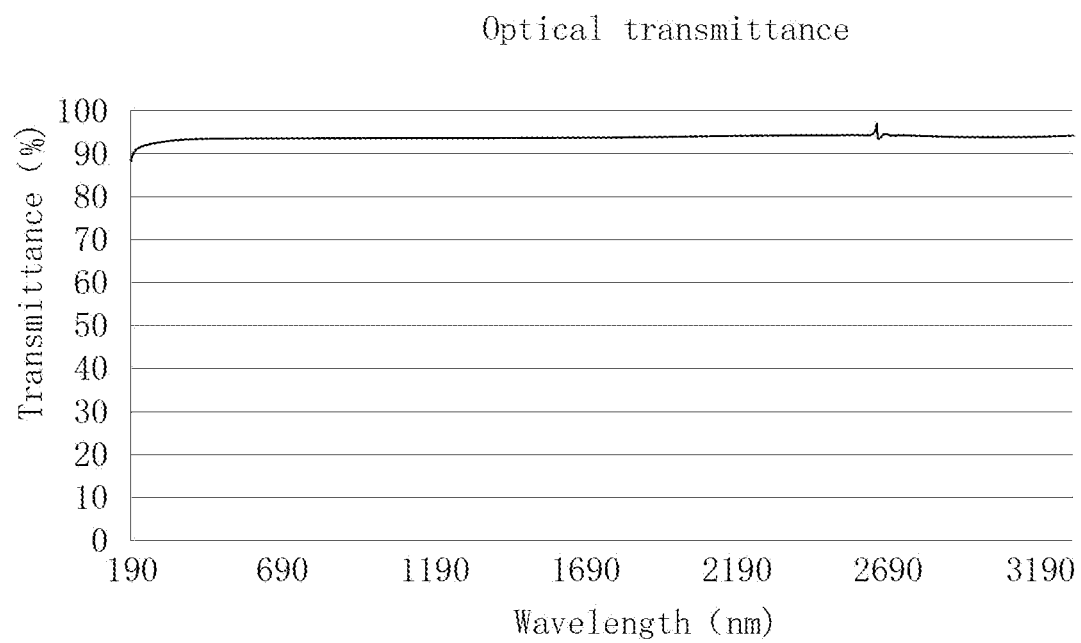
FIG. 2 is a spectral transmittance graph of the quartz glass with low content of hydroxyl and high purity, prepared by an embodiment of the present disclosure.

In the embodiment, referring to FIG. 2, the spectral transmittance of the quartz glass at 190 nm to 2700 nm is greater than 90%. The content of metal impurity in the quartz glass is less than 0.2 ppm. The stress birefringence is less than 2 nm/cm.

The quartz glass with low content of hydroxyl and high purity provided by the present disclosure has a low content of hydroxyl, which increases the transmittance. The quartz glass can be applied in high-power lasers, has the characteristics of low heat generation and long service life. The quartz glass can also suitable for being processed into ultraviolet, infrared or full-band optical lenses, and has the characteristics of high transmittance. The quartz glass can also be processed into optical windows with excellent high temperature resistance, or high pressure or corrosion resistance. The quartz glass can also be processed into photomask substrates, wafers, and other products with high optical transmittance and high material stability.

The preparation method and the performance of the products are illustrated by following examples.

Example 1

The gaseous silicon tetrachloride with a purity of more than 99.999% was hydrolyzed in a hydrogen-oxygen flame with a purity of more than 99.9999%, to obtain the silica powders. The density of the silica powders ρ was 0.6 g/cm$^3$.

The silica powders are kept at a temperature of T1 in a high-temperature furnace, wherein T1 was 300 degrees Celsius. Helium was used as a protective gas, and the purity of the helium was 99.9999%. The heat preservation time period t1 was 5 h.

A mix gas of helium and chlorine was introduced into the high-temperature furnace containing the silica powders. The flow ratio of helium and chlorine was 20:1. The amount of the chlorine was 0.4 kg. The furnace temperature T2 was 900 degrees Celsius. The reaction time t2 was 1 h. Then, the first dehydroxylated powders were obtained.

The temperature of the high-temperature furnace containing the first dehydroxylated powders was raised to T3 of 1150 degrees Celsius. A mix gas of helium and oxygen was introduced. The flow ratio of helium and oxygen was 5:1. The reaction time t3 was 5 h. Then, the second dehydroxylated powders was obtained.

A helium of high purity was introduced into the high-temperature furnace containing the second dehydroxylated powders. The purity of the helium was 99.999999%. The temperature was gradually increased to T4 of 1350 degrees Celsius. The reaction time t4 was 3 h. Then, the vitrified body was obtained.

The vitrified body was cooled to 300 degrees Celsius at a speed v of 50 minutes per degree Celsius, and then cooled at room temperature to obtain the quartz glass.

Samples 1 #, 2 #, 3 #, and 4 #were prepared according to the above conditions. The content of metal impurity, hydroxyl, spectral transmittance, optical uniformity, and stress birefringence were shown in Table 1.

The transmittance in Table 1 refers to the ratio of energy of light waves at specific wavelengths (190 nm, 2700 nm) after transmitted through the quartz glass with respect to that before incident on the quartz glass. The optical uniformity in Table 1 refers to the uneven degree of refractive index changes over different portions in the designated region, which is expressed by a maximum difference of the refractive index changes. The stress birefringence in Table 1 refers to the optical path difference of the light caused by the density difference in different regions in the quartz glass.

The preparation method of Example 1 can be mainly divided into four main steps, including powder synthesis, powder dehydroxylation, powder vitrification, and annealing. In Example 1, the content of hydroxyl in each sample is less than 1 ppm, and the optical uniformity is less than or equal to $43 \times 10^{-6}$.

Example 2

The gaseous silicon tetrachloride with a purity of more than 99.999% was hydrolyzed in a hydrogen-oxygen flame with a purity of more than 99.9999%, to obtain the silica powders. The density of the silica powders p was 0.6 g/cm$^3$.

The silica powders are kept at a temperature of T1 in a high-temperature furnace, wherein T1 was 300 degrees Celsius. Helium of high purity was used as a protective gas, and the purity of the helium was 99.9999%. The heat preservation time period t1 was 5 h.

A mix gas of helium and chlorine was introduced into the high-temperature furnace containing the silica powders. The flow ratio of helium and chlorine was 20:1. The amount of the chlorine was 0.4 kg. The furnace temperature T2 was 900 degrees Celsius. The reaction time t2 was 1 h. Then, the first dehydroxylated powders were obtained.

The temperature of the high-temperature furnace containing the first dehydroxylated powders was raised to T3 of 1150 degrees Celsius. A mix gas of helium and oxygen was introduced. The flow ratio of helium and oxygen was 5:1. The reaction time t3 was 5 h. Then, the second dehydroxylated powders was obtained.

A helium of high purity was introduced into the high-temperature furnace containing the second dehydroxylated powders. The purity of the helium was 99.999999%. The temperature was gradually increased to T4 of 1350 degrees Celsius. The reaction time t4 was 3 h. Then, the vitrified body was obtained.

The vitrified body was further heat at a temperature T5 of 1800 degrees Celsius, to homogenize the vitrified body. The homogenization time period t5 was 3 h.

TABLE 1

| Sample No. | Content of metal impurity (ppm) | Content of hydroxyl (ppm) | Spectral transmittance at 190 nm | Spectral transmittance at 2700 nm | Optical uniformity | Stress birefringence (nm/cm) |
|---|---|---|---|---|---|---|
| 1# | 0.1 | <1 | 91% | 92% | $35 \times 10^{-6}$ | 2.0 |
| 2# | 0.1 | <1 | 91% | 92% | $40 \times 10^{-6}$ | 2.3 |
| 3# | 0.1 | <1 | 92% | 92% | $43 \times 10^{-6}$ | 2.4 |
| 4# | 0.1 | <1 | 92% | 92% | $37 \times 10^{-6}$ | 2.1 |

The vitrified body was cooled to 300 degrees Celsius at a speed v of 50 minutes per degree Celsius, and then cooled at room temperature to obtain the quartz glass.

Samples 5 #, 6 #, 7 #, and 8 #were prepared according to the above conditions. The content of metal impurity, hydroxyl, spectral transmittance, optical uniformity, and stress birefringence were shown in Table 2.

TABLE 2

| Sample No. | Content of metal impurity (ppm) | Content of hydroxyl (ppm) | Spectral transmittance at 190 nm | Spectral transmittance at 2700 nm | Optical uniformity | Stress birefringence (nm/cm) |
|---|---|---|---|---|---|---|
| 5# | 0.1 | <1 | 91% | 92% | $0.8 \times 10^{-6}$ | 1.0 |
| 6# | 0.1 | <1 | 91% | 92% | $1.1 \times 10^{-6}$ | 1.3 |
| 7# | 0.1 | <1 | 92% | 92% | $1.2 \times 10^{-6}$ | 1.4 |
| 8# | 0.1 | <1 | 92% | 92% | $1.0 \times 10^{-6}$ | 1.1 |

The preparation method of Example 2 can be mainly divided into five main steps, including powder synthesis, powder dehydroxylation, powder vitrification, high-temperature homogenization, and annealing. In Example 2, the content of hydroxyl in each sample is less than 1 ppm, and the optical uniformity is $0.8 \times 10^{-6}$ to $1.2 \times 10^{-6}$. Compared with Example 1, it can be found that the high-temperature homogenization can significantly improve the optical uniformity of the quartz glass.

Comparative Example 1

The gaseous silicon tetrachloride with a purity of more than 99.999% was hydrolyzed in a hydrogen-oxygen flame with a purity of more than 99.9999%, to obtain the silica powders. The density of the silica powders ρ was 0.6 g/cm³.

The silica powders are kept at a temperature of T1 in a high-temperature furnace, wherein T1 was 300 degrees Celsius. Helium of high purity was used as a protective gas, and the purity of the helium was 99.9999%. The heat preservation time period t1 was 5 h.

A mix gas of helium and chlorine was introduced into the high-temperature furnace containing the silica powders. The flow ratio of helium and chlorine was 20:1. The amount of the chlorine was 0.4 kg. The furnace temperature T2 was 900 degrees Celsius. The reaction time t2 was 1 h. Then, the first dehydroxylated powders were obtained.

A helium of high purity was introduced into the high-temperature furnace containing the silica powders. The purity of the helium was 99.999999%. The temperature was gradually increased to T4 of 1350 degrees Celsius. The reaction time t4 was 3 h. Then, the vitrified body was obtained.

The vitrified body was further heat at a temperature T5 of 1800 degrees Celsius, to homogenize the vitrified body. The homogenization time period t5 was 3 h.

The vitrified body was cooled to 300 degrees Celsius at a speed v of 50 minutes per degree Celsius, and then cooled at room temperature to obtain the quartz glass.

Samples 9 #, 10 #, 11 #, and 12 #were prepared according to the above conditions. The content of metal impurity, hydroxyl, spectral transmittance, optical uniformity, and stress birefringence were shown in Table 3.

TABLE 3

| Table 3 Sample No. | Content of metal impurity (ppm) | Content of hydroxyl (ppm) | Spectral transmittance at 190 nm | Spectral transmittance at 2700 nm | Optical uniformity | Stress birefringence (nm/cm) |
|---|---|---|---|---|---|---|
| 9# | 0.1 | <1 | 91% | 92% | $10 \times 10^{-6}$ | 1.7 |
| 10# | 0.1 | <1 | 91% | 92% | $11 \times 10^{-6}$ | 1.9 |
| 11# | 0.1 | <1 | 92% | 92% | $12 \times 10^{-6}$ | 2.0 |
| 12# | 0.1 | <1 | 92% | 92% | $11 \times 10^{-6}$ | 1.8 |

The preparation method of Comparative Example 1 can be mainly divided into five main steps, including powder synthesis, powder dehydroxylation, powder vitrification, high-temperature homogenization, and annealing. No mixed gas of helium and oxygen was used to replace the remaining chlorine in the powder dehydroxylation step. Thus, it can be found that the content of hydroxyl in each sample in Comparative Example 1 is less than 1 ppm, and the optical uniformity is $10 \times 10^{-6}$ to $12 \times 10^{-6}$. Compared with Example 2, it can be found that the residual chlorine reduces the optical uniformity of the quartz glass.

Comparative Example 2

The gaseous silicon tetrachloride with a purity of more than 99.999% was hydrolyzed in a hydrogen-oxygen flame with a purity of more than 99.9999%, to obtain the silica powders. The density of the silica powders ρ was 0.6 g/cm³.

A helium of high purity was introduced into the high-temperature furnace containing the silica powders. The purity of the helium was 99.999999%. The temperature was gradually increased to T4 of 1350 degrees Celsius. The reaction time t4 was 3 h. Then, the vitrified body was obtained.

The vitrified body was cooled to 300 degrees Celsius at a speed v of 50 minutes per degree Celsius, and then cooled at room temperature to obtain the quartz glass.

Samples 13 #, 14 #, 15 #, and 16 #were prepared according to the above conditions. The content of metal impurity, hydroxyl, spectral transmittance, optical uniformity, and stress birefringence were shown in Table 4.

TABLE 4

| Table 4 Sample No. | Content of metal impurity (ppm) | Content of hydroxyl (ppm) | Spectral transmittance at 190 nm | Spectral transmittance at 2700 nm | Optical uniformity | Stress birefringence (nm/cm) |
|---|---|---|---|---|---|---|
| 13# | 0.2 | 35 | 89% | 60% | $1.0 \times 10^{-6}$ | 1.2 |
| 14# | 0.2 | 36 | 89% | 61% | $1.1 \times 10^{-6}$ | 1.3 |
| 15# | 0.2 | 34 | 89% | 62% | $0.9 \times 10^{-6}$ | 1.4 |
| 16# | 0.2 | 33 | 88% | 61% | $1.0 \times 10^{-6}$ | 1.2 |

The preparation method of Comparative Example 2 can be mainly divided into three main steps, including powder synthesis, powder vitrification, and annealing. It can be found that the content of hydroxyl in each sample in Comparative Example 1 is higher than 30 ppm, and the optical uniformity is $0.9 \times 10^{-6}$ to $1.1 \times 10^{-6}$. Compared with Example 1, it can be found that chlorine can significantly reduce the content of hydroxyl, and at the same time reduce the optical uniformity of the final quartz glass.

Although the embodiments of the present disclosure have been shown and described, those having ordinary skill in the art can understand that changes may be made within the principles of the present disclosure, up to and including the full extent established by the broad general meaning of the terms used in the claims. It will, therefore, be appreciated that the embodiments described above may be modified within the scope of the claims.

What is claimed is:

1. A method for preparing quartz glass with low content of hydroxyl and high purity, comprising:
    preparing silica powders, the silica powders comprising hydroxyl groups;
    dehydroxylating the silica powders, comprising:
        adjusting a temperature of a furnace to a first temperature and drying the silica powders in the furnace at the first temperature;
        raising the temperature of the furnace up to a second temperature and introducing a first oxidizing gas comprising halogen gas into the furnace, a total mass of the introduced first oxidizing gas being within 1% of a total mass of the silica powders, thereby heating the silica powers at the second temperature and obtaining first dehydroxylated powders;
        raising the temperature of the furnace up to a third temperature and introducing a second oxidizing gas comprising oxygen or ozone into the furnace, thereby heating the silica powers at the third temperature and obtaining second dehydroxylated powders;
    heating the second dehydroxylated powders up to a fourth temperature to vitrify the second dehydroxylated powders, thereby obtaining a vitrified body; and
    cooling the vitrified body to obtain the quartz glass.

2. The method of claim 1, wherein after heating the second dehydroxylated powders up to the fourth temperature to obtain the vitrified body, the method further comprises:
    heating the vitrified body up to a fifth temperature in a range of 1600 degrees Celsius to 2300 degrees Celsius for 1 hour or more, thereby homogenizing the vitrified body.

3. The method of claim 1, wherein cooling the vitrified body further comprises:
    cooling the vitrified body from the fourth temperature to room temperature with a cooling speed greater or equal to 20 minutes per degree Celsius.

4. The method of claim 1, wherein preparation of the silica powders comprises:
    providing a silicon-containing raw material; and
    hydrolyzing the silicon-containing raw material by a vapor deposition method to form the silica powders.

5. The method of claim 4, wherein the silicon-containing raw material comprises at least one of $SiF_4$, $C_6H_{18}Si_3$, $C_8H_{24}O_4Si_4$, $C_{10}H_{30}O_5Si_5$, and $C_{12}H_{36}O_6Si_6$.

6. The method of claim 4, wherein the vapor deposition method comprises one of a chemical vapor deposition method, a plasma chemical vapor deposition method, a vapor axial deposition method, and an outside vapor deposition method.

7. The method of claim 1, wherein at least one of the first oxidizing gas comprises at least one of fluorine gas, chlorine gas, and bromine gas.

8. The method of claim 1, wherein at least one of the first oxidizing gas and the second oxidizing gases further comprises an inert gas, and the inert gas comprises at least one of nitrogen, helium, and argon.

9. The method of claim 1, wherein the first temperature is in a range of 200 degrees Celsius to 400 degrees Celsius, the second temperature is in a range of 700 degrees Celsius to 1000 degrees Celsius, the third temperature is in a range of 1050 degrees Celsius to 1250 degrees Celsius, and the fourth temperature is in a range of 1300 degrees Celsius to 1500 degrees Celsius.

* * * * *